(12) United States Patent
Russell et al.

(10) Patent No.: US 12,293,151 B2
(45) Date of Patent: May 6, 2025

(54) AI-BASED LANGUAGE TESTING PROCESS FOR CI/CD

(71) Applicant: SAP SE, Walldorf (DE)

(72) Inventors: Lindsay Russell, Walldorf (DE); Tacye Huegel, Walldorf (DE); Shanavas Madeen S, Krishnagir (IN); Win Acharya, Bangalore (IN)

(73) Assignee: SAP SE, Walldorf (DE)

( * ) Notice: Subject to any disclaimer, the term of this patent is extended or adjusted under 35 U.S.C. 154(b) by 607 days.

(21) Appl. No.: 17/547,625

(22) Filed: Dec. 10, 2021

(65) Prior Publication Data

US 2023/0186019 A1 Jun. 15, 2023

(51) Int. Cl.
*G06F 40/263* (2020.01)
*G06N 5/04* (2023.01)
*G06N 20/00* (2019.01)

(52) U.S. Cl.
CPC ............ *G06F 40/263* (2020.01); *G06N 5/04* (2013.01); *G06N 20/00* (2019.01)

(58) Field of Classification Search
CPC ......... G06F 40/263; G06N 5/04; G06N 20/00
USPC .......................................................... 704/9
See application file for complete search history.

(56) References Cited

U.S. PATENT DOCUMENTS

| | | | |
|---|---|---|---|
| 10,275,266 B1 * | 4/2019 | Bhavineni | G06F 40/58 |
| 2018/0268728 A1 * | 9/2018 | Burdis | G09B 7/04 |
| 2023/0011250 A1 * | 1/2023 | Bussa | G06F 11/3684 |

\* cited by examiner

*Primary Examiner* — Thierry L Pham
(74) *Attorney, Agent, or Firm* — Buckley, Maschoff & Talwalkar LLC (57) ABSTRACT

Provided are systems and methods for automated language testing for use in continuous integration and continuous delivery software development. In one example, the method may include identifying language tests in a plurality of different natural languages to be performed for a software application, executing the language tests and validating the language tests based on results of executed scripts, automatically assigning the language tests among a plurality of language testers based on execution of a machine learning model which pairs together a language test with a language tester based on test attributes and tester attributes, and transmitting notifications to computing devices of the plurality of language testers with information about the automatically assigned language tests.

20 Claims, 9 Drawing Sheets

| Feature ID | Application ID | Test Case ID | Language | Tester | Status |
|---|---|---|---|---|---|
| X23T54 | B83E | 14 | French | User A | Pass |
| X23T54 | B83E | 14 | Belgian | User F | Pass |
| X23T54 | B83E | 14 | Portugese | User B5 | Pass |
| X23T54 | B83E | 14 | Japanese | User U | Fail |
| X23T54 | B83E | 14 | Spanish | User C | Pass |
| X23T54 | B83E | 14 | Italian | User J | Pass |
| ... | ... | ... | ... | ... | ... |
| X23T54 | B83E | 14 | German | User J | Pass |

AI-BASED LANGUAGE TESTING PROCESS FOR CI/CD

BACKGROUND

Software applications distributed on a global basis may initially comprise content and user interface features written for users of a specific natural language. For example, an application developer may submit a developed software application to a provider of a host platform. Here, the developer may submit the software designed for a particular language (e.g., English, etc.) and the provider may translate the application content and visual features into multiple other natural languages (e.g., French, German, Hindi, etc.). Language testing (also referred to as localization testing) may then be performed to ensure that the application content and visual features are working according to local and cultural practices associated with the different languages and cultures. However, due to the significant amount of user interaction that is required, language testing is a time-consuming process. Such delays prohibit or otherwise limit language testing for software applications that are developed in a continuous integration and continuous delivery (CI/CD) development environment.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Software development often involves developing versions of the software for different natural languages. For example, features of the software which a user interacts with such as user interface elements and application content, may be output in different natural languages. Language testing, as described herein, refers to testing the features of an application in each of the different languages that it is intended for and ensuring that such features work according to the local practices and customs of the corresponding natural language, culture, locale, etc. It also means that translations are available in each of the languages and the meaning is correct with respect to the context.

Language testing may include content localization such as graphics and text that include language-specific text. Language testing may also include feature-based testing such as determining whether or not a feature should be displayed for a particular locality/region. Language testing may also include testing the dates and numbering format according to the practices of the locale/region. Language testing may also include checking the user interface to ensure that language-specific text, menus, prompts, alerts, images, toolbars, status bars, dialog boxes, etc., are displayed correctly and include the correct language-specific text. Language testing may also include checking the rendering to ensure that all the supported scripts are displayed. Other features of language testing are also possible, and these examples should not be construed as limiting of the types of testing that can be performed.

The development environment (e.g., IDE, etc.) may be implemented as a web application, cloud application, etc. that is accessible via the Internet. Here, the host of the development environment may offer to translate the application into multiple different languages (e.g., 50 languages or more, etc.). The host may require that the application be successfully tested in each of the different languages before the application is subsequently deployed to a live environment. The classical method of testing the individual language versions of a software product before it is released involves testers (humans) manually logging onto a test system and navigating through the application in the individual language. However, this process is highly inefficient due to a number of issues such as display issues, hard-to-follow test descriptions, missing language-based test data, and the like.

Recently, a new approach to language testing referred to as START-based Automated Language Testing (SALT) has been introduced which provides the tester with screenshots of the test case (e.g., the UI element, etc.) in a particular language prior to the testing being performed. The screenshots can show the tester how the user interfaces appear in a particular language without having to log on to a test system. This significantly reduces the amount of time it takes for the tester to perform the testing. With SALT, a developer automates a test case by navigating through an application and recording the steps in a test case scenario. Next, the developer can submit the test case to the host platform. When the test case is executed, screenshots are generated in all languages together with the tool tips, labels, and direct links to the relevant object in the translation system. This information is provided to the individual language testers when the testing is performed thereby reducing the amount of time the testers spend on the testing.

Meanwhile, continuous integration and continuous delivery (CI/CD), also referred to herein as continuous feature delivery, is a process in which a development environment introduces automation and continuous monitoring into the development pipeline of the software application in an effort to speed-up and provide a near continuously updated/integrated application while under development. For example, processes such as integration, testing, delivery, deployment, etc. can be automated in some way. Successful integration may refer to new code changes to an application being regularly built, tested, and merged to a shared repository. Continuous delivery may refer to developer changes to an application being bug tested and uploaded to a repository such as GitHub where they can be deployed to a live production environment. Continuous deployment may refer to automatically releasing a developer's changes from the repository into a productive environment.

However, the current language testing process using SALT does not support continuous delivery such as a "CI/CD" model. Instead, the language testing is geared towards a waterfall-like release cycle for each individual product. The whole language test set-up, test script creation and actual testing process is divided into non-overlapping sequential phases ("Prepare", "Check", "Test" and "Finalize") that are not able to be run in parallel. Each phase typically requires manual intervention on the part of the developers, language test event coordinators and testers. Although extremely efficient for the testers as a result of the SALT screenshots, the complete end-to-end process is highly time-consuming for the developers and coordinators, taking on average 3-4 weeks from start to finish. Since the executions are on dedicated VMs, the technical processes are resource-intensive and not scalable. In addition, the test result is set at program and language level and not at individual feature level.

The example embodiments address the drawbacks in the art of language testing and provided for an automated and intelligent language testing application/platform that can be integrated into a web-based development environment such as a continuous delivery environment and that can automate various parts of the language testing process to significantly expedite the end-to-end time it takes for language testing of a software application. To be able to support continuous feature delivery, the application allows the test case of an application feature (e.g., UI element, content, etc.) to pass seamlessly through the preparation and testing process independently of other test cases and of pre-set phases, require the minimum of manual interaction and reduce the total end-to-end process to something much shorter than 3-4 weeks, for example, 24-48 hours (due to time-zone differences among the testers worldwide).

According to various embodiments, to support continuous feature delivery, the web-based development environment may be modified to perform automated language testing. For example, the concept of non-overlapping sequential phases ("Prepare", "Check", "Test" and "Finalize") may be replaced by an event that enables continuous nomination of test scripts and ongoing testing. It is the individual feature that is given a testing status (pass/no pass) for a particular language and not the software release version which includes many features in its entirety for that language. Automated language testing, also referred to herein as SALT, may be integrated, through APIs, with a continuous integration continuous delivery (CI/CD) lifecycle application that manages the statuses of the features of a software application and the delivery readiness.

The features requiring language testing may be controlled by the CI/CD lifecycle application which informs the automated language testing application of the features and the test scripts via an application programming interface (API). Delivery readiness of a feature (allowing it to be shipped with all languages) may be blocked by the CI/CD application until all languages for a feature have a "pass" status, as communicated by the automated language testing application to the CI/CD lifecycle application. For example, the CI/CD application may store a table, index, document, etc. which includes flags or other identifiers indicating the pass/fail status of each language test. The CI/CD application may prohibit the software application from being deployed into a live environment until all of the languages have tested successfully (i.e., are labelled with a pass status).

To start the testing process, a developer may execute a script for testing an element of the application in a predefined natural language (e.g., English, etc.), 1Q, and at least one other natural language. In this example, 1Q is a technical language which can be used on the user interfaces of applications to identify technical names behind actual texts that appear on the screen. For example, if a user were to log on in language 1Q, rather than seeing English or some other natural language, the user would see the technical name of the strings. Accordingly, if there is a screenshot of a UI in French and a user wants to change the translation of a text in the top right-hand corner, the user can log on in 1Q and find the exact same spot where the text appears. Here, the user can see the technical name of the text that the user wants to change. From this view, the user can use links containing the technical 1Q codes to jump directly to the repository where the texts are stored (e.g., an ABAP backend system, etc.) In response to receiving the script and the screenshots in the predefined natural language submitted by the developer, the CI/CD application may notify the language testing application via an API call which identifies the application, the UI element, the screen shot, etc. Furthermore, the developer may be notified of the expected time for completion of testing. Here, the language testing application may predict the expected time for completion of testing based on a machine learning model that receives information about the testing to be performed (e.g., number of tests, languages, involved, etc.) as inputs into the machine learning model, which then predicts a total time or expected completion time. The machine learning model may be trained based on historical language test cases and times and the attributes associated with the historical language test cases.

In response, the automated language testing application may automatically execute the script for all other required languages on a particular server or cluster of servers (e.g., a KUBERNETES® cluster, etc.) such as those in a hyperscale architecture of a data center and generate the 1Q codes required for object identification and also the links to the translation system required for enabling translators acting as testers to make immediate corrections. The high availability of the test execution infrastructure and autoscaling together with amplified performance enable scaling with optimized resource utilization. The time between the developer executing the script in English, 1Q and at least one other language and the screenshots being available in all languages is no more than 24 hours. Following execution of the scripts, the automated language testing application sets the status to "Test". A test script is ready for testing and it is automatically assigned to a "best bet" tester for each language. The testers are automatically notified that a new script is available for testing. Furthermore, an approximate turnaround time for testing (e.g., 24 hours, etc.) is required for each language. For each feature requiring testing, the end-to-end turnaround time may be set for a predefined threshold such as 48 hours (24 for execution and 24 for testing). Depending on the overall workload and the time zones, this may be shorter or longer in duration. The developer is informed of the "estimated arrival time" of the completed test for the feature.

Testers for each language test the scripts and set the status of each step. When all steps are complete, the automated language testing application assigns or otherwise updates a testing status for each language test from fail to pass, etc. The results can be consolidated at various levels. When a test is ongoing and a new feature is needed, new test cases can be nominated for testing. The language test cycles can continue irrespective of the failed/passed statuses. When testing is successfully complete for each language and each feature, the automated language testing application may update the status in the CI/CD application via the API. Furthermore, the required stakeholders including the developer may be notified. Furthermore, if all languages tests pass, the feature is released for delivery. If one or more language tests do not pass, the release may be blocked. As soon as errors are corrected and a "pass" is achieved, the automated language testing application may update the CI/CD application and remove the block enabling the feature to be released for all languages. In this way, language testing for continuous feature delivery is guaranteed in a fast, efficient and highly automated manner.

Figure 1:
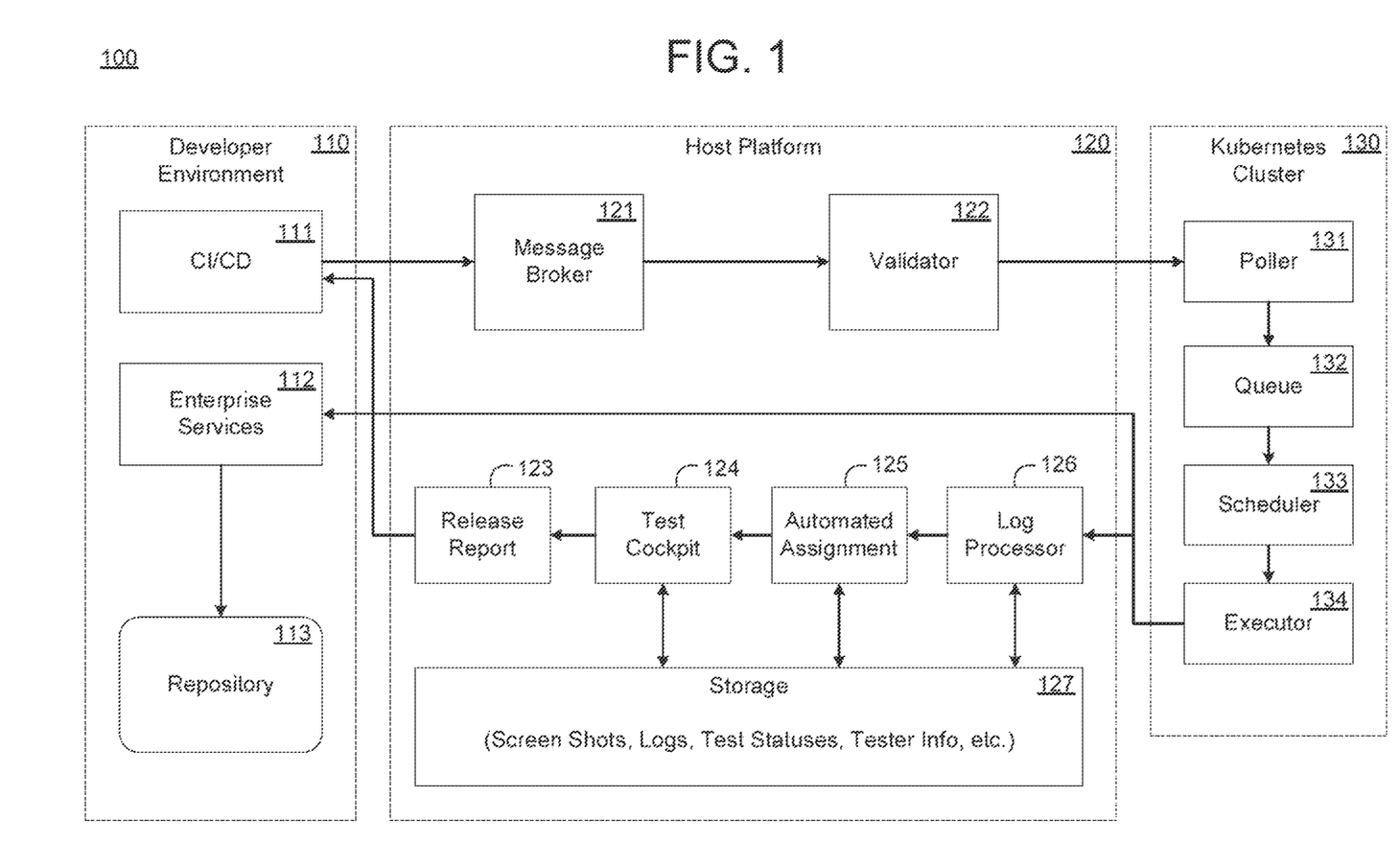
FIG. 1 is a diagram illustrating a computing environment for automated language testing in accordance with an example embodiment.

FIG. 1 illustrates a computing environment 100 for automated language testing in accordance with an example embodiment. Referring to FIG. 1, the computing environment 100 may include a host platform 120 such as a web server, a cloud platform, a database, and the like, which implements the functionality of an automated language testing application for software development. The computing environment 100 may also include a developer environment 110 that is implemented by the host platform 120 or that is connected remotely to the host platform 120 via a network. Here, the developer environment 110 includes a continuous integration continuous delivery (CI/CD) application 111.

In this example, a developer may submit a test case for a particular feature of the software application through the CI/CD application 111. An automated test case is mandatory for the language test process. The test can may include a test script. The CI/CD application 111 provides the test case/test script to the host platform 120 and a message broker 121 identifies the feature. For example, the test case and the test script may be submitted by the CI/CD application 111 via an API call of an API of the host platform 120, not shown. From there, a validator 122 launches instances of the test script in all languages to be tested via a dedicated virtual machine on a Kubernetes cluster 130. Here, a poller 131 polls the validator 122 for any details of the test case and then stores it in a queue 132. Also, the developer may be notified of the approximate time that will be taken for language testing which is predicted using machine learning. Then the test cases are scheduled via a scheduler 133 and executed via an executor 134 which launches the application in all of the different languages and schedules the testing.

Figure 4:
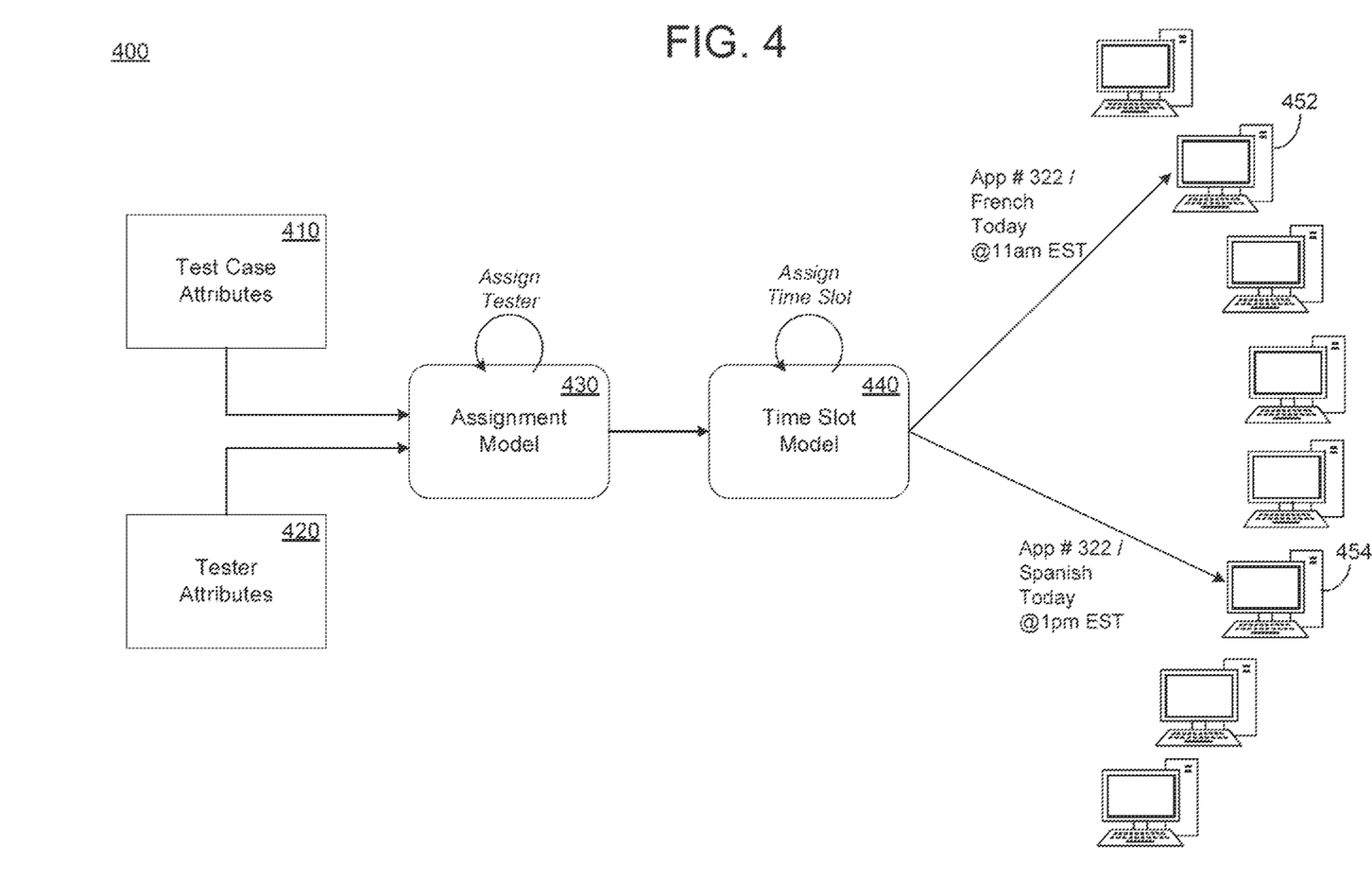
FIG. 4 is a diagram illustrating a process of automatically assigning a language test to a tester in accordance with an example embodiment.

Next, an automated assignment module 125 may be informed of the executing application instances on the virtual machine of the Kubernetes cluster 130 and perform an automated tester assignment and time slot assignment using various models as further described with respect to FIG. 4. For example, testers may be assigned based on availability of the tester, previous work of the testers, language of expertise, etc. The assignment process may be automated via machine learning to make this possible.

The host platform 120 may notify the individual testers of their assigned test cases and the times of performing the assigned test cases which are automatically generated by the automated assignment module 125 of the host platform 120. Testers may then access their tests, screen shots, assignment details, etc., via a test cockpit 124 of the host platform 120. The testing results are then processed by a log processor 126 which stores the screen shots, logs, test statuses of everything, etc. in a storage 127. Successfully executed test cases and features are added to a repository 113 via one or more enterprise services 112. In some embodiments, the host platform 120 may generate a release report 123 regarding the statuses of the language tests and forward the release report 123 to the CI/CD application 111 via the API.

Software releases are typically rolled out periodically over time. For example, a new version/release of a software application may be built and released every couple of months. Language testing is a significant reason for the amount of time necessary for each release because language testing typically requires multiple weeks (e.g., 3 to 4 weeks, etc.) to complete. The example embodiments are directed to an intelligent language testing platform that can greatly improve various processes of the language testing by leveraging machine learning and artificial intelligence, thereby significantly reducing the time needed for language testing from three or four weeks to one day or less.

An example use case was performed to compare the automated language testing application described by the present application versus traditional language testing application that relies on a human to manually assign the test cases and notify the testers of such assignments. The use case included 124 test cases for 91 software applications, 123 language testers, and 26 total languages (natural languages) for the different test cases. In the traditional language testing application (non-automated), it took approximately 20 seconds per test case—tester assignment. As a result, it took approximately 18 hours for the user/software application to assign a total of 3224 test cases (124 test cases*26 languages=3224 test cases).

In contrast, the automated language testing application of the example embodiments may use machine learning to automatically assign test cases to testers based on the attributes of the test cases and the attributes of the language testers. Here, it took approximately one minute to assign the 3224 test cases using the automated language testing application thereby significantly reducing the amount of time it took to assign the test cases.

It should be appreciated that the automated test case assignment is not the only aspect of the automated language testing application that conserves time. The automated language testing platform may dedicate a hyperscalar or other computing system such as a server, virtual machine, database node, computing system, or the like, for performing all of the test cases and also launching all of the test cases. Furthermore, prior to launching the test cases, the automated language application needs to execute scripts for all of the different languages and perform a pre-flight check on each language/test to ensure that the tester is even necessary. For example, the pre-flight check may detect when a screen shot is missing or when a user interface element is missing or displayed incorrectly. Further examples are provided herein.

Figure 2A:
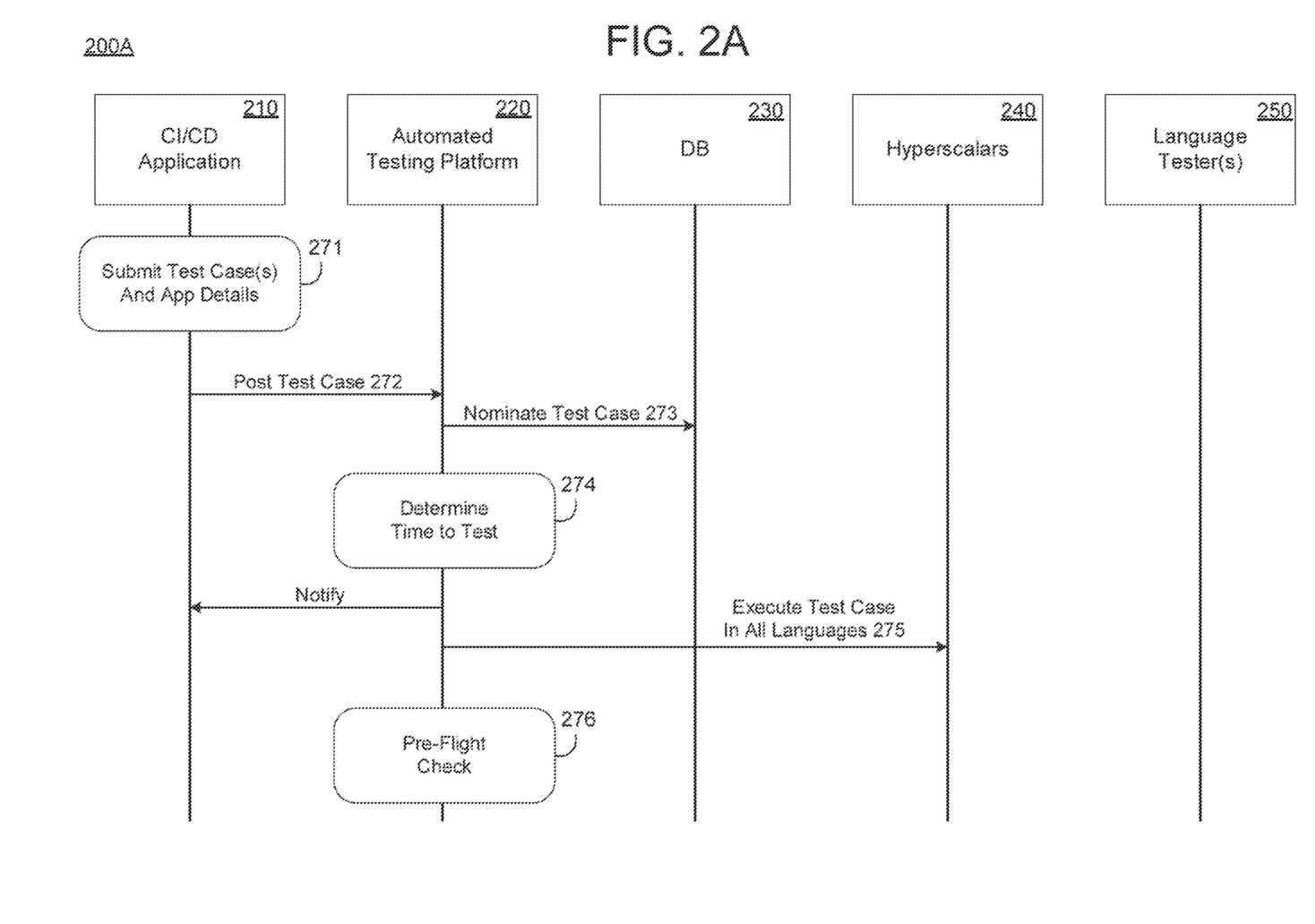
FIGS. 2A-2B are diagrams illustrating a process of performing automated language testing in accordance with an example embodiment.
Figure 2B:
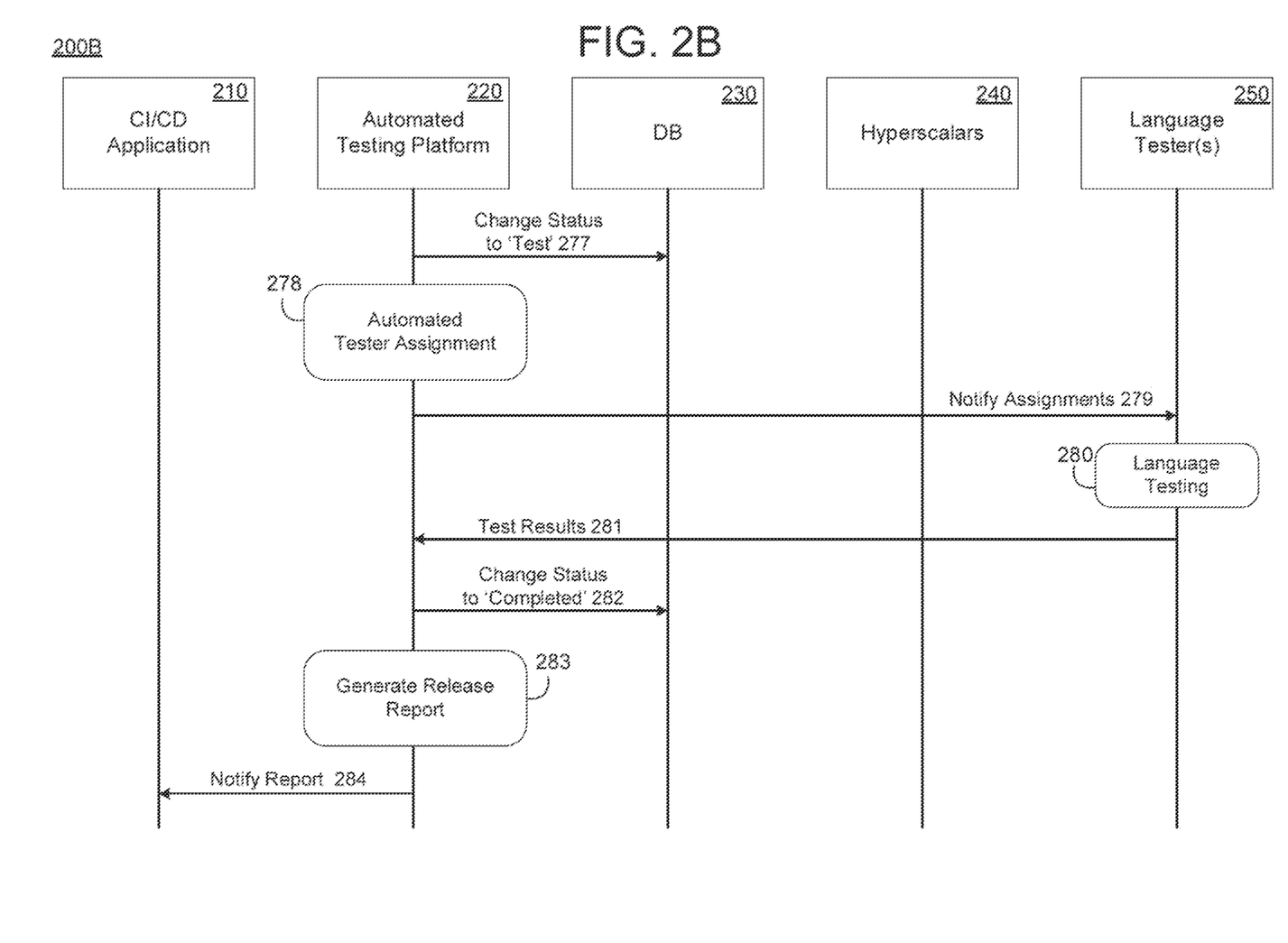

FIGS. 2A and 2B illustrates processes 200A and 200B, respectively, of performing automated language testing in accordance with an example embodiment. For example, the processes may be performed by an automated language testing platform 220 that is running/hosted on the host platform 120 shown in FIG. 1, but embodiments are not limited thereto. Here, the automated language testing platform 220 may facilitate the end-to-end process for performing the automated language tests for a software application from start to completion. Here, the automated language testing platform 220 may communicate with a development environment (e.g., such as an integrated development environment, etc.). In the example embodiments, the development environment may also be hosted on the host platform 120 or some other server/platform. Here, the development environment may be a continuous integration and continuous delivery (CI/CD) application 210, but embodiments are not limited thereto. In other words, it should be appreciated that the automated language testing platform 220 does not require a continuous feature delivery development environment, but may be used in any development environment.

In FIG. 2A, the automated language testing platform 220 may store its data in a database 230 including the tester attributes, the test case attributes, scripts for language testing, a configuration table for managing pass/fail statuses of the language tests, and the like. The automated language testing platform 220 may also be connected to a hyperscalar 240 hosted on a server or cluster of servers that are hosted on the host platform or hosted on another platform. When performing the language tests, language testers 250 (user devices thereof) may log into the hyperscalar 240 and perform the language testing in the dedicated space.

The language testing process performed in the example embodiments assumes a couple of pre-requisites including that feature development is complete and that translations are available and language testers 250 are also ready and available. Also, the process assumes that the test cases are available and working in English, 1Q, and at least one other language.

Referring to FIG. 2A, in 271, a developer may upload the name of a test case for a feature of the application being developed that may be located on a page or pages of the application. Here, the test case may cause changes to a user interface displayed by the software application. The changes can be visualized by a user while the user is logged into and interacting with the user interface. In this example, the test case may be designed for a particular natural language (e.g., English). That is, the user interface elements and the content being displayed by the test are in English. In response, in 272, the CI/CD application 210 may generate an automated API call which is sent to the automated language testing platform 220 (e.g., via an API of the automated language testing platform 220) with the details of the test case including feature IDs for the feature. For example, the details may include an application name, a feature ID, scripts for testing the app/feature, and the like.

In 273, the automated language testing platform 220 sends a nominate script command which nominates the test script for a currently active release version of the software application. For every release there is no manual creation of an event. The system automatically identifies a timeline for the event based on predefined start/stop times for various release (September, October, etc.) These are release intervals. A test event is the time period during which the application in question is language tested. As soon as the script is nominated it can be taken up for the next steps in the testing process. In 274, the automated language testing platform 220 may determine an expected amount of time that it will take to perform all of the language tests using machine learning and provide that information to the CI/CD application 210 and notify the test case provider via the CI/CD application 210. Here, the automated language testing platform 220 may use machine learning to predict an amount of time it takes for all of the languages to be successfully tested.

In 275, the automated language testing platform 220 may execute the test case in all languages that are nominated for testing on the hyperscalar 240 and get back the results. The initial submission from the developer in 271 may include a script that has been tested in 3 languages (US, DE, 1Q, etc.) However, the developer may request that the application be tested for a total of 39 different languages. In this case, the language test will be carried out in all 39 languages (natural languages). In 275, the automated language testing platform 220 may initiate 39 instances of the application in the 39 different natural languages, respectively.

In this example, the host platform may translate the same test case elements into multiple different languages and then launch instances of the application in each of those different languages. In other words, a same copy of a software application written for users in different natural languages (e.g., Indian, French, English, Spanish, etc.) can be launched simultaneously by the automated language testing platform 220. Language testing is a process that includes inspecting user interface elements, content, and the like, of an application to ensure that the elements and the content appear correctly in the translated language.

In 276, the automated language testing platform 220 changes a status of the test case to pre-flight check and then performs the pre-flight check to ensure that the test case is appropriate at this time. For example, the automated language testing platform 220 may compile and execute the application in each of the different languages and verify that the necessary screen shots, user interface elements, and the like, are present. If a screen shot is missing or a user interface element is missing, the automated language testing platform 220 may flag the test case and notify the developer. Examples of the pre-flight check are described with respect to FIGS. 3A and 3B. Here, the automated language testing platform 220 may use previously-generated screen shots and other content from the execution in a particular language (e.g., English) and use this to perform the pre-flight check/validation for all of the languages because the pre-flight check is verifying/validating a number of screens and tooltips, etc., and not necessarily what the content says. The pre-flight check is successful when the automated language testing platform 220 determines that all the screens are there for all of the languages, and all of the other items (e.g., tooltips, etc.) are there for all of the languages. If some languages do not pass the pre-flight check, the language testing may be terminated or it may move forward with only those languages that did pass.

The process 200A shown in FIG. 2A continues in process 200B shown in FIG. 2B. When the pre-flight check is completed, in 277, the automated language testing platform 220 may change a status of the test case to testing and in 278 the automated language testing platform 220 may automatically assign the test cases to language testers (users) in a large pool of language testers 250. The automated language testing platform 220 may use a model, for example, a machine learning model, a statistical model, etc., to identify the most optimal language tester 250 for a particular language test based on various attributes such as availability, language, history, etc. Once the language testers 250 have been identified, in 279, the automated language testing platform 220 may send out notifications to the language testers 250 (e.g., emails, SMS messages, etc.) indicating the tests that have been assigned.

In 280, the language testers 250 may manually test the features in the different languages and return their results to the automated language testing platform 220. The tests create screen shots, labels, and tooltips in the corresponding language and the testers are checking for correctness and completeness. Using the automated language testing platform 220, testers are able to jump from screen shots to the translation environment so that its testing and correction all at once. They can also report development issues to the developer via an integrated environment. It saves this manual testing. In 281, the results of the testing are reported to the automated language testing platform 220. In 282, the automated language testing platform 220 changes a status of the test case to completed, and in 283, generates a report with new features for the next release. In 284, the report is forwarded to the CI/CD application 284 where it can be viewed by a user.

Figure 3A:
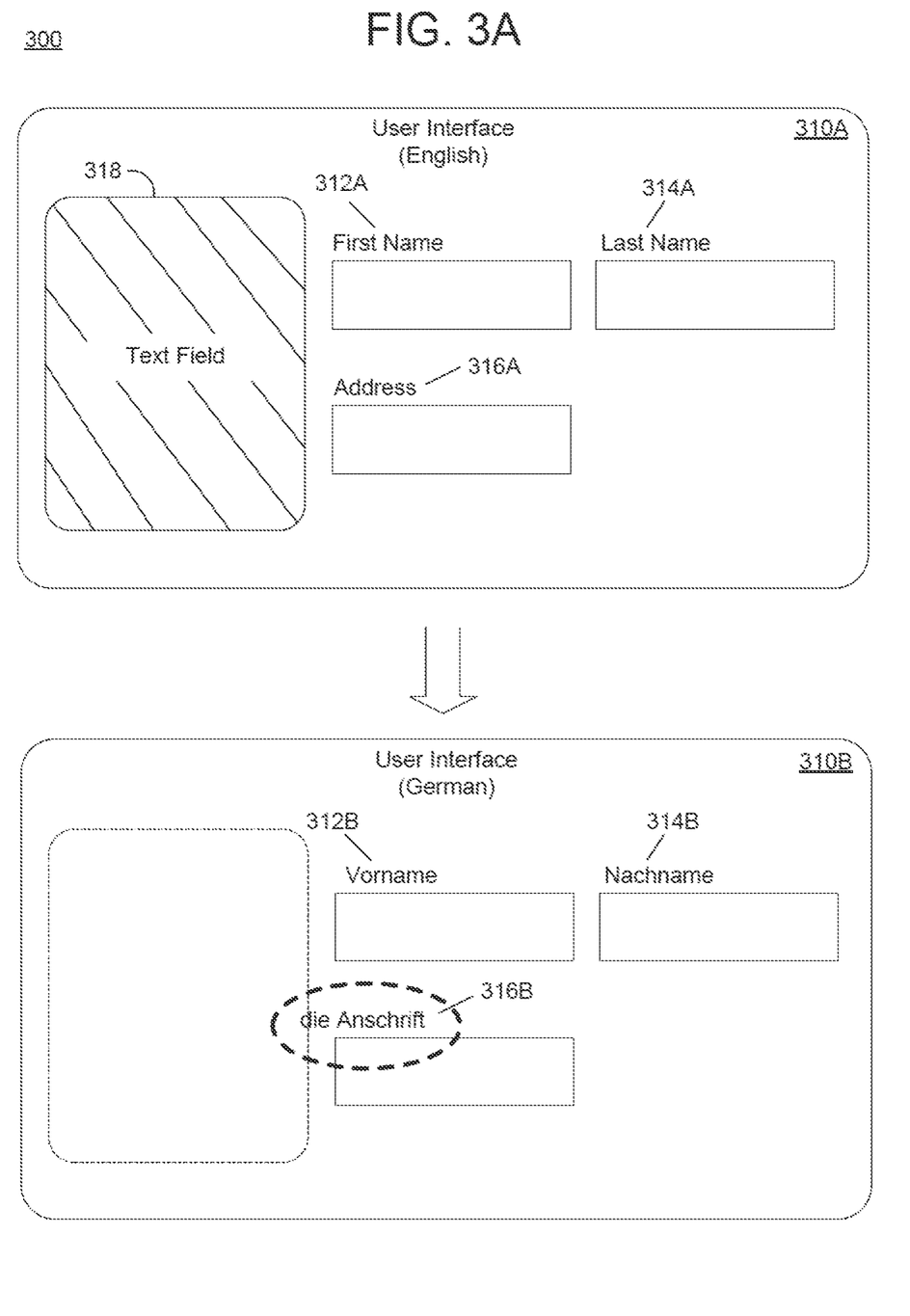
FIG. 3A is a diagram illustrating a process of validating user interface content of an application in accordance with an example embodiment.

FIG. 3A illustrates a process 300 of validating user interface content of an application in accordance with an example embodiment. The automated language testing application may validate the test cases to be performed via a pre-flight check. When a test case is submitted for testing by a developer, the developer may be required to submit successful test case results for the test case in one or more languages. For example, the developer may submit the test case and its corresponding results from execution in English, 1Q and DE.

Here, the automated language testing application may identify details of the test case such as the number of screen shots that should be generated, various pieces of content that should be shown (e.g., labels, tool tips, etc.), and the like, and store this information in a data store of the automated language testing application. Furthermore, when the translated versions/scripts of the test case are executed, the automated language testing application may compare the number of screen shots and the content generated for the translated version with the number of screen shots and content provided by the developer and stored in the data store to determine/detect if any of the screen shots or content are missing.

Referring to FIG. 3A, automatic execution of test cases creates a screen shot 310A that corresponds to the execution of the test case in English. Here, the screen shot 310A illustrates the various UI elements that should be present on the screen including a first field 312A, a second field 314A, a third field 316A, and a text field 318 which may include a string of text such as a paragraph or phrase. Here, each of the first, second, and third fields including English versions of the field names. For example, the first field 312A has the field name "First Name", the second field 314A has the field name "Last Name", and the third field has a field name "Address". The text field 318 is data that is displayed within the screen shot 310A and provides the viewer with some additional information.

Figure 3B:
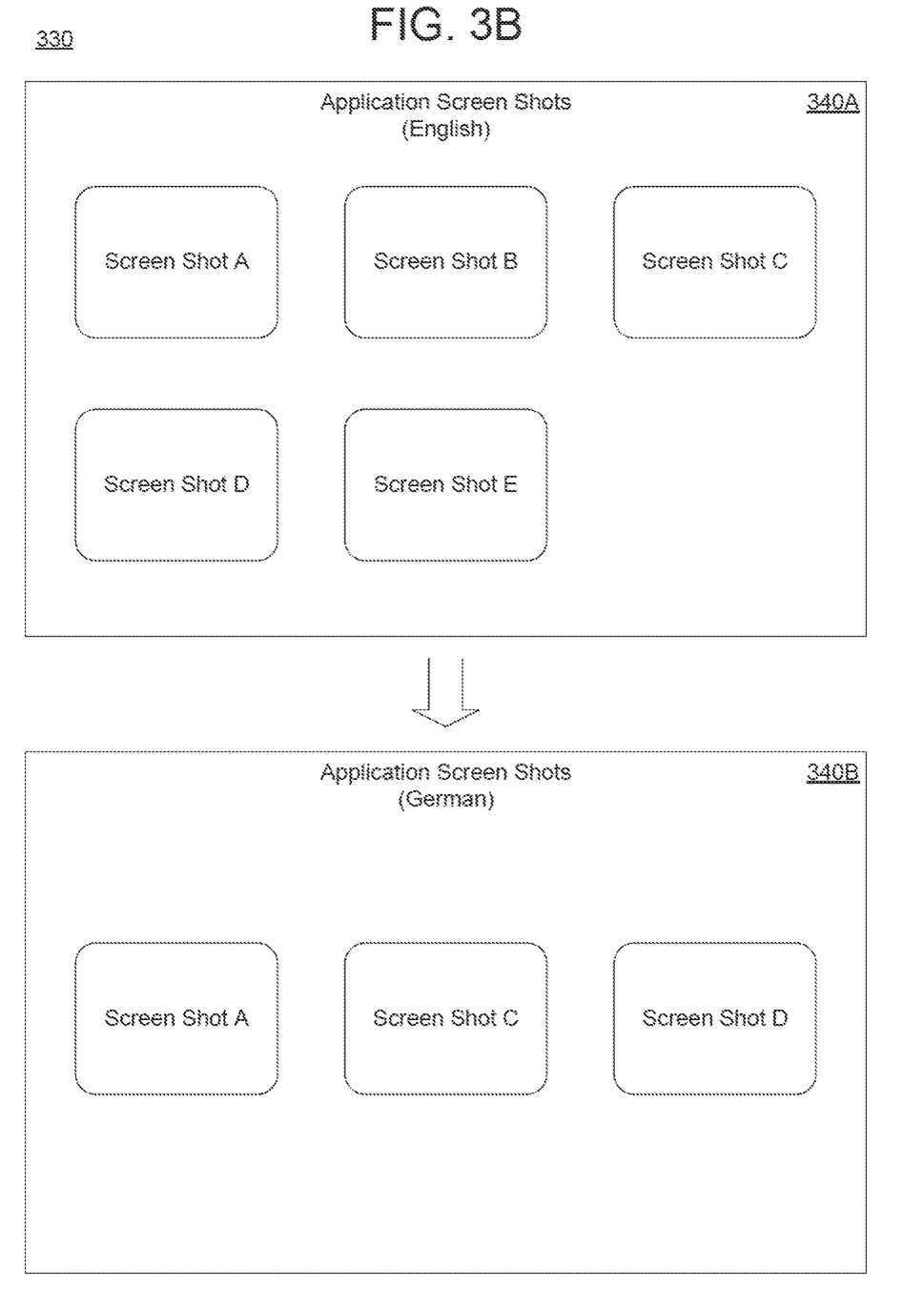
FIG. 3B is a diagram illustrating a process of validating screen shots of an application in accordance with an example embodiment.

As further shown in FIG. 3A, when the screen shot 310A is translated into a screen shot 310B in German, as shown in FIG. 3B, an error occurs. In particular, the field names of the fields 312B, 314B, and 316B are now in German rather than English. However, the text field 318 is not displayed in the screen shot 310B as a result of the error. According to various embodiments, the automated language testing application may store and configure a table with various parameters of a test case including the number of total screen shots, identifiers of UI controls and fields included on each screen, etc. These values can be obtained by the automated language testing application from the initially submitted test case package from the developer. For example, the automated language testing application may identify each unique UI element on each page by its unique ID with respect to other UI elements of the application and store mappings of the UI elements to pages.

When the automated language testing application generates a translation for a particular natural language, it may compare the number of total screen shots, page content, etc. with the total screen shots and UI content submitted by the developer and stored in the data store of the automated language testing application. In the example of FIG. 3A, the text field 318 is not displayed in the German-based screen shot 310B because the field name for the third field 316B is too big and it causes an error because it overlaps with the text field 318. The result is that the application does not render the text field 318 within the screen shot 310B. As another example, the content within the text field 318 may become tool large thereby causing the same issue (i.e., the text field 318 cannot be displayed, etc.)

FIG. 3B illustrates a process 330 of validating screen shots of an application in accordance with an example embodiment. Referring to FIG. 3B, the automated language testing application may verify the total number of screen shots of the executed script for the test case match the total number of screen shots submitted by the developer and stored in the data store. As shown in FIG. 3B, the application screen shots 340A submitted by the developer in English include a total of five screen shots. In contrast, the application screen shots 340B generated by the automated language testing application translating the English version into the German version, creates a total of three screen shots for the test case. This error can be detected by the automated language testing application during the pre-flight check.

FIG. 4 illustrates a process 400 of automatically assigning a language test to a tester in accordance with an example embodiment. Referring to FIG. 4, the automated language testing application described herein may include various models such as machine learning, statistical, optimization, etc., for identifying and assigning an optimal language tester to each language test. In FIG. 4, the automated language testing application includes an assignment model 430 that is configured to identify an optimal language tester for a particular language test based on test case attributes 410 and tester attributes 420. The test case attributes 410 may include the number of features, pages, content items, etc. to be tested, the language, etc. The tester attributes 420 may include availability such as a daily/hourly schedule of availability and unavailability of the testers, languages spoken, current workload, and the like. This information can be input to the assignment model 430 which identifies the optimal tester for a language test. Furthermore, a time slot model 440 may identify a best (e.g., fastest) time slot for the language test from among the availability in the tester's schedule.

In FIG. 4, the application assigns a French version of a test case for a software application to a first language tester 452 and assigns a Spanish version of the same test case of the software application to a second language tester 454. The times, days, languages, etc. that are assigned to the language testers may vary. It's possible, but in many cases, each different language requires a different language tester or almost as many language testers. Coordination among these testers can be difficult. Therefore, the automated language testing application described herein can deploy instances of the test scripts/applications in the different languages in a shared virtual environment such as a hyperscalars at a datacenter thereby isolating the data and the testing into a particular location improving efficiency. Furthermore, the time taken for manual assignment which can be hours or even days of time over the course of a release of software can be relieved thereby significantly expediting the language testing process.

Figure 5:
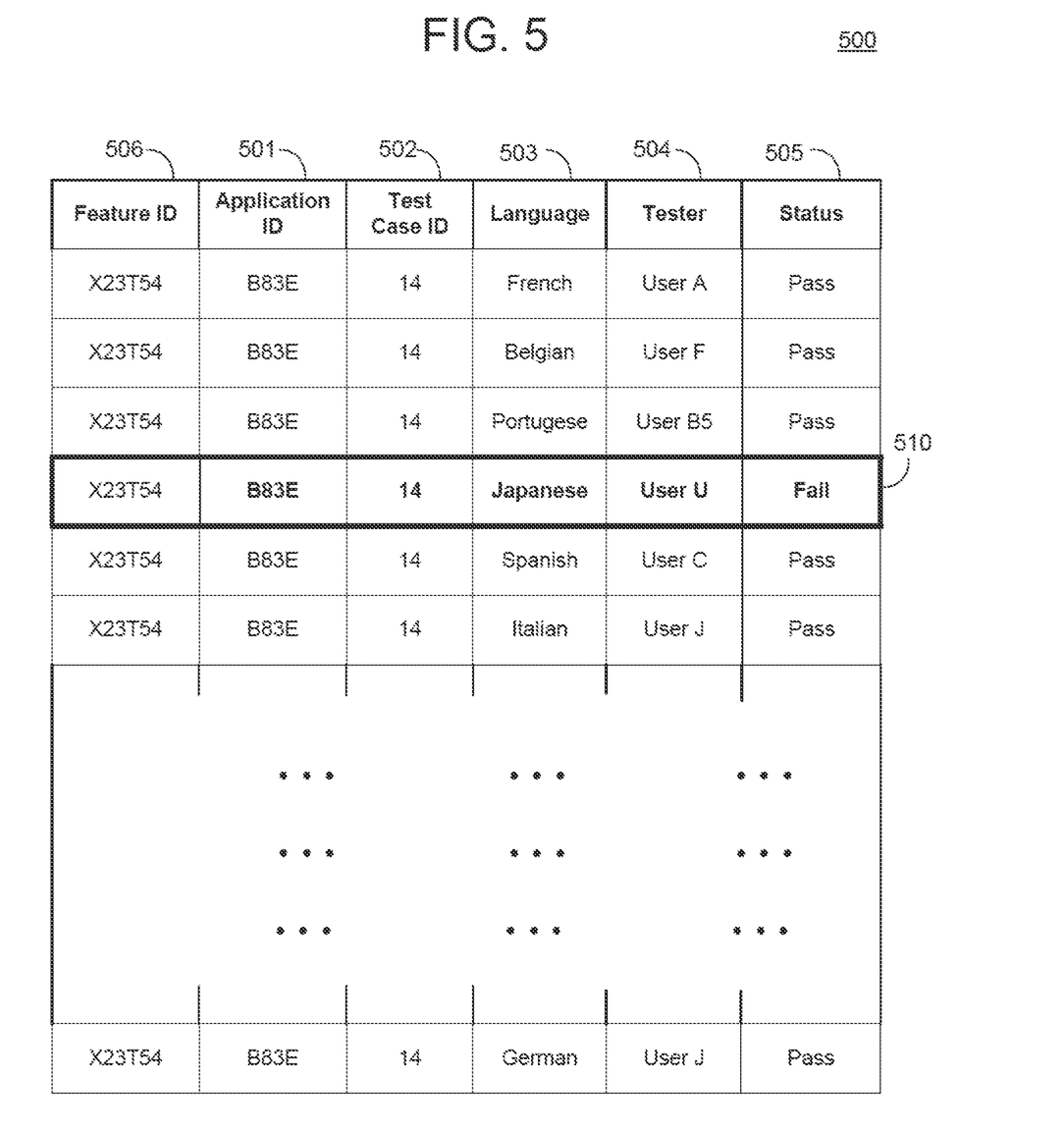
FIG. 5 is a diagram illustrating a data structure for managing automated language testing in accordance with an example embodiment.

FIG. 5 illustrates a data structure 500 for managing automated language testing in accordance with an example embodiment. As an example, the data structure 500 may be a table or an index, but embodiments are not limited thereto. The data structure 500 may be used by the automated language testing application described herein to determine whether or not a test case has successfully passed. This may require that the test case pass for each and every language that is to be translated. If one or more of the test cases/languages fail, the developer can be asked to submit a modified/fixed version of the test case until all of the test cases pass. The automated language testing application may manage the data structure 500. For example, the automated language testing application may read data values from the fields, write data values to the fields, delete data values previously stored in the fields, modify data values currently stored in the fields, and the like.

As shown in FIG. 5, the data structure 500 includes a plurality of fields 501, 502, 503, 504, 505, and 506, for application ID, test case ID, language, tester ID, status, and feature ID, respectively. Here, the feature ID 506 corresponds to the user interface feature or control that is being tested. It is not necessary that the data structure 500 include any of these fields. Therefore, it should be understood that different fields may be stored in the data structure 500. As each tester finishes performing their respective tests for a particular test case, they may send notifications to the automated language testing application, for example, via a submit button, via a message such as an email, via a command line input, etc. In response, the automated testing application identifies the results of the language testing and tracks it in the data structure 500. For example, the status field 505 may be used to track the status of a particular language test case.

The automated language testing application may fill-in values within the data structure 500 based on data submitted by the testers. The automated language testing application may also check the data structure 500 to determine whether each of the language tests for a particular test case has passed. In this case, the automated language testing application may detect whether or not all of the language tests for a particular test case have successfully passed. If any of the language tests have not passed, the automated language testing application may continue to wait for a predetermined period of time. Also, the automated language testing application may terminate the test case and require re-submission.

In FIG. 5, an entry 510 corresponds to a Japanese language test for test case 14 of an application with the identifier (B83E). In this case, the data structure 500 also includes the identifiers of the testers assigned to each language test. In this case, the entry 510 indicates that the Japanese language test for test case '14' performed by tester 'User U' has failed. If the User U is subsequently able to successfully test the test case 14 in Japanese, the User U may submit notification and the automated language testing application may modify the status value to indicate that the status is pass.

Figure 6:
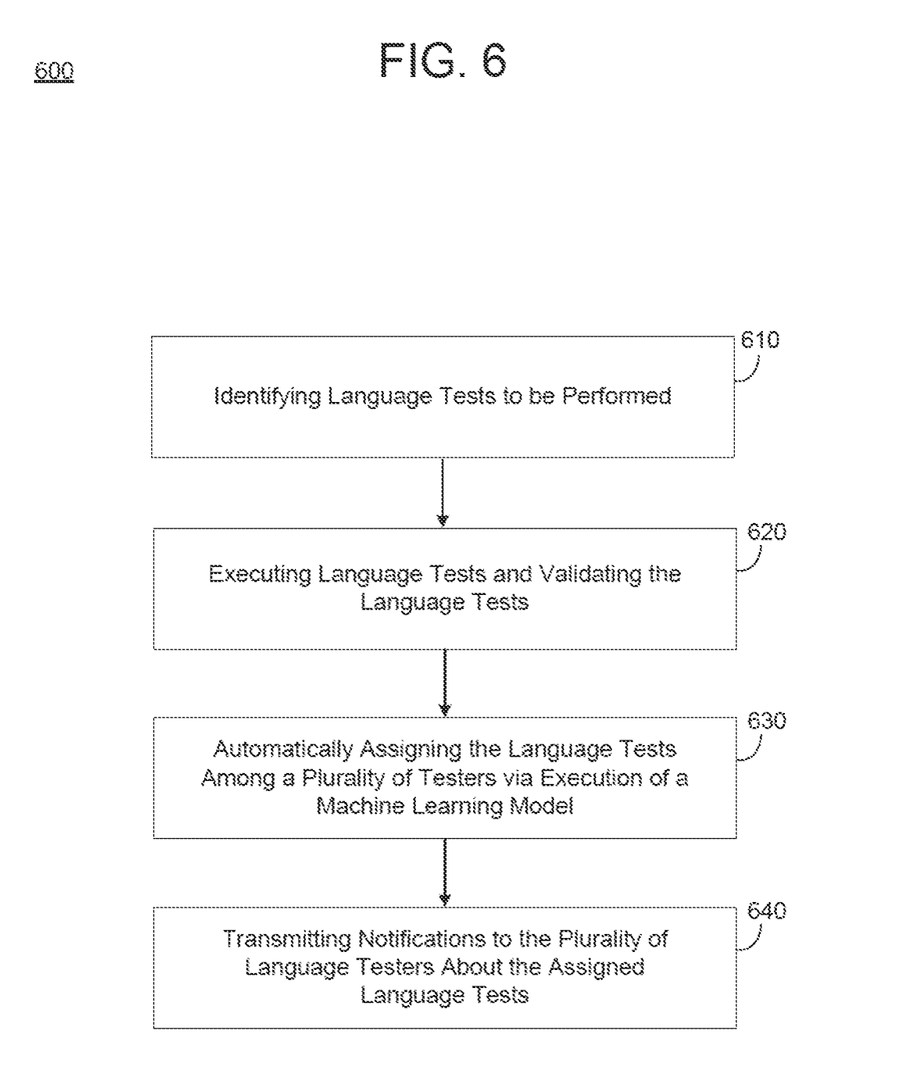
FIG. 6 is a diagram illustrating a method for automated language testing of a software application in accordance with an example embodiment.

FIG. 6 illustrates a method 600 for automated language testing of a software application in accordance with an example embodiment. As an example, the method 600 may be performed by a cloud platform, a web server, an on-premises server, a user device, a combination of devices, and the like. The method 600 may be an automated method that is performed by a software application. In other words, the commands may be predefined and issued by the software application during an automated testing process. Referring to FIG. 6, in 610, the method may include identifying language tests in a plurality of different natural languages to be performed for a user interface element of a software application. For example, the language tests may be identified based on an API call from a continuous delivery application.

In 620, the method may include executing scripts for the language tests of the user interface element and validating the language tests based on results of the executed scripts. In 630, the method may include automatically assigning the language tests among a plurality of language testers based on execution of a machine learning model which pairs together a language test with a language tester based on test attributes and tester attributes. In 640, the method may include transmitting notifications to computing devices of the plurality of language testers with information about the automatically assigned language tests.

In some embodiments, the identifying may include receiving an application programming interface (API) call from another software application with identifiers of the nominated language tests, and the executing comprises executing the scripts based on the identifiers of the scripts included in the API call. In some embodiments, the executing may include instantiating the scripts for all of the language tests on a single dedicated cluster of computers. In some embodiments, the method may further include predicting, via execution of a second machine learning model, a time it will take to complete all of the language tests and displaying a notification of the predicted time via a user interface.

In some embodiments, the validating may include executing a pre-flight check on each language test to ensure that the language test can be performed. In some embodiments, the pre-flight check may include executing a script for a respective language test and validating a number of screen shots and a visibility of the user interface element within the screen shots as a result of executing the script. In some embodiments, the pre-flight check may include comparing screen shots of a language test for a first natural language submitted by a user with screen shots generated for a second natural language that is created by executing the scripts. In some embodiments, the method may further include detecting that the language tests have completed successfully, changing a status of the language tests to completed, and transmitting results of the language tests to a computer terminal associated with the software application.

Figure 7:
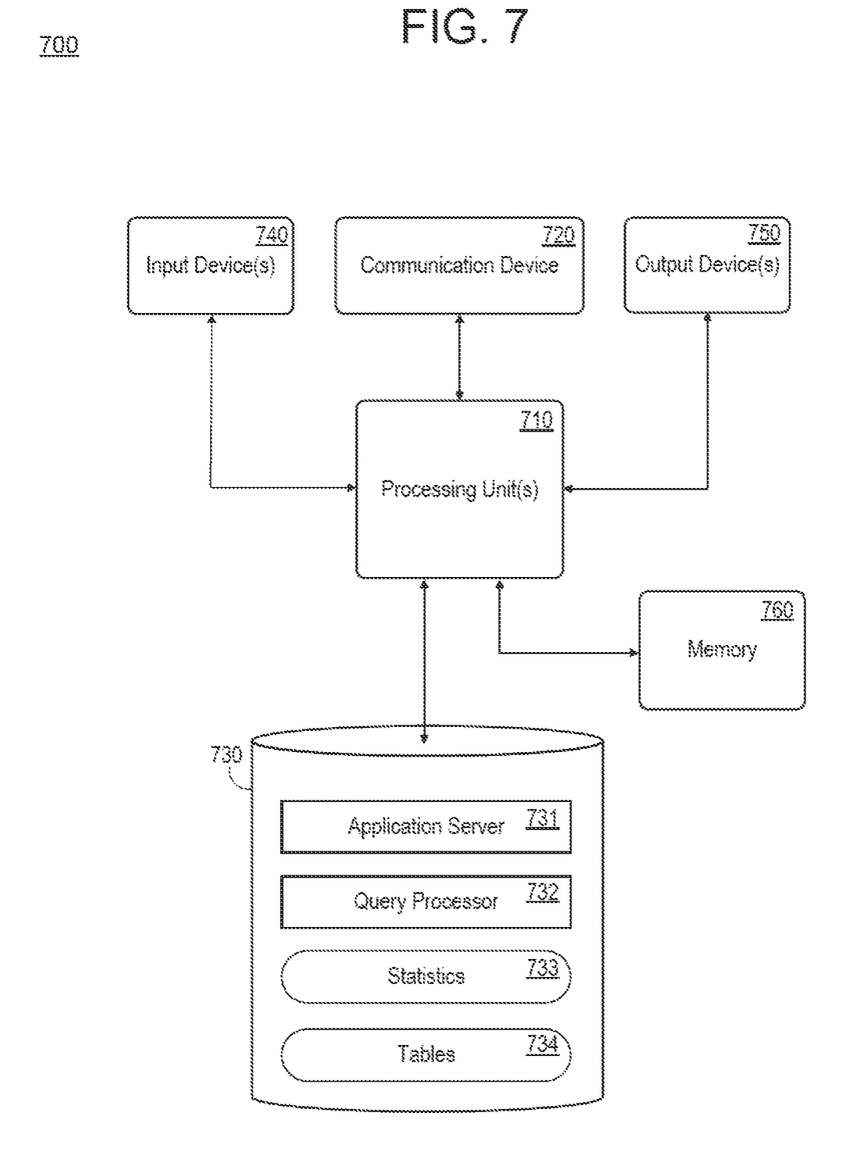
FIG. 7 is a diagram illustrating a computing system for use with any of the examples herein in accordance with an example embodiment.

FIG. 7 is a diagram of a server node 700 according to some embodiments. The server node 700 may include a general-purpose computing apparatus and may execute program code to perform any of the functions described herein. The server node 700 may comprise an implementation of a remote terminal or a host platform, in some embodiments. It should also be appreciated that the server node 700 may include other unshown elements according to some embodiments and may not include all of the elements shown in FIG. 7.

Server node 700 includes processing unit(s) 710 (i.e., processors) operatively coupled to communication device 720, data storage device 730, input device(s) 740, output device(s) 750, and memory 760. Communication device 720 may facilitate communication with external devices, such as an external network or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into the server node 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM). In some embodiments, the data storage device 730 may store user interface elements in tabular form. For example, one or more columns and one or more rows of user interface elements may be displayed in a two-dimensional spreadsheet, table, document, digital structure, or the like.

Application server 731 and query processor 732 may each comprise program code executed by processing unit(s) 710 to cause server node 700 to perform any one or more of the processes described herein. Such processes may include estimating selectivities of queries on tables 734 based on statistics 733. Embodiments are not limited to execution of these processes by a single computing device. Data storage device 730 may also store data and other program code for providing additional functionality and/or which are necessary for operation of server node 700, such as device drivers, operating system files, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to:
process a test case for a particular feature of a software application received from a continuous integration and continuous delivery (CI/CD) application;
identify language tests in a plurality of different natural languages to be performed for a user interface element of the software application based on the test case;
execute the language tests of the user interface element and validate the language tests based on results of the execution;
automatically assign the language tests among a plurality of language testers based on execution of a machine learning model which pairs together a language test with a language tester based on test attributes and tester attributes, the test attributes including at least a number of features, pages or content items to be tested for the particular feature, and the tester attributes including at least one of a respective schedule of availability or a current workload for each of the plurality of language testers;
a network interface configured to transmit notifications to computing devices of the plurality of language testers with information about the automatically assigned language tests; and
responsive to performing the language tests, update a status of the CI/CD application via an application programming interface (API).

2. The computing system of claim 1, wherein the processor is configured to receive an API call from the CI/CD application with identifiers of scripts for the language tests, and execute the scripts based on the identifiers of the scripts included in the API call.

3. The computing system of claim 1, wherein the processor is configured to execute the language tests for all languages on a single dedicated cluster of computers.

4. The computing system of claim 1, wherein the processor is configured to predict, via execution of a second machine learning model, a time it will take to complete all of the language tests and displaying a notification of the predicted time via a user interface.

5. The computing system of claim 1, wherein the processor is configured to execute a pre-flight check on each language test to ensure that the language test can be performed.

6. The computing system of claim 5, wherein the processor is configured to execute a script for a respective language test and validate a number of screen shots and a visibility of the user interface element within the screen shots as a result of executing the script.

7. The computing system of claim 5, wherein the processor is configured to compare screen shots of a language test for a first natural language submitted by a user with screen shots generated for a second natural language that is created by the execution.

8. The computing system of claim 1, wherein the processor is configured to detect that the language tests have completed successfully, change a status of the language tests to completed, and transmit results of the language tests to a computer terminal associated with the software application.

9. A method comprising:
processing a test case for a particular feature of a software application received from a continuous integration and continuous delivery (CI/CD) application;
identifying language tests in a plurality of different natural languages to be performed for a user interface element of the software application based on the test case;
executing the language tests of the user interface element and validating the language tests based on results of the execution;
automatically assigning the language tests among a plurality of language testers based on execution of a machine learning model which pairs together a language test with a language tester based on test attributes and tester attributes, the test attributes including at least a number of features, pages or content items to be tested for the particular feature, and the tester attributes including at least one of a respective schedule of availability or a current workload for each of the plurality of language testers;
transmitting notifications to computing devices of the plurality of language testers with information about the automatically assigned language tests; and
responsive to performing the language tests, updating a status of the CI/CD application via an application programming interface (API).

10. The method of claim 9, wherein the identifying comprises receiving an API call from the CI/CD application with identifiers of scripts for the language tests, and the executing comprises executing the scripts based on the identifiers of the scripts included in the API call.

11. The method of claim 9, wherein the executing comprises initiating the language tests for all languages on a single dedicated cluster of computers.

12. The method of claim 9, wherein the method further comprises predicting, via execution of a second machine learning model, a time it will take to complete all of the language tests and displaying a notification of the predicted time via a user interface.

13. The method of claim 9, wherein the validating comprises executing a pre-flight check on each language test to ensure that the language test can be performed.

14. The method of claim 13, wherein the pre-flight check comprises executing a script for a respective language test and validating a number of screen shots and a visibility of the user interface element within the screen shots as a result of executing the script.

15. The method of claim 13, wherein the pre-flight check comprises comparing screen shots of a language test for a first natural language submitted by a user with screen shots generated for a second natural language that is created by the execution.

16. The method of claim 9, wherein the method further comprises detecting that the language tests have completed successfully, changing a status of the language tests to completed, and transmitting results of the language tests to a computer terminal associated with the software application.

17. A non-transitory computer-readable storage medium comprising instructions which when executed by a processor cause a computer to perform a method comprising:
processing a test case for a particular feature of a software application received from a continuous integration and continuous delivery (CI/CD) application;
identifying language tests in a plurality of different natural languages to be performed for a user interface element of the software application based on the test case;
executing the language tests of the user interface element and validating the language tests based on results of the execution;
automatically assigning the language tests among a plurality of language testers based on execution of a machine learning model which pairs together a language test with a language tester based on test attributes and tester attributes, the test attributes including at least a number of features, pages or content items to be tested for the particular feature, and the tester attributes including at least one of a respective schedule of availability or a current workload for each of the plurality of language testers;
transmitting notifications to computing devices of the plurality of language testers with information about the automatically assigned language tests; and
responsive to performing the language tests, updating a status of the CI/CD application via an application programming interface (API).

18. The non-transitory computer-readable medium of claim 17, wherein the identifying comprises receiving an API call from the CI/CD application with identifiers of scripts for the language tests, and the executing comprises executing the scripts based on the identifiers of the scripts included in the API call.

19. The non-transitory computer-readable medium of claim 17, wherein the executing comprises executing the language tests111 for all languages on a single dedicated cluster of computers.

20. The non-transitory computer-readable medium of claim 17, wherein the method further comprises predicting, via execution of a second machine learning model, a time it will take to complete all of the language tests and displaying a notification of the predicted time via a user interface.

* * * * *